United States Patent [19]
Azuma et al.

[11] Patent Number: 6,031,824
[45] Date of Patent: Feb. 29, 2000

[54] MAINTENANCE AND SUPERVISORY CONTROL METHOD AND SYSTEM FOR MULTIPLEX COMMUNICATION EQUIPMENT

[75] Inventors: Kazumasa Azuma; Kaoru Suzuki; Ikuo Aso; Sakae Watanabe, all of Koriyama, Japan

[73] Assignee: Hitachi Telecom Technologies, Ltd., Fukushima-ken, Japan

[21] Appl. No.: 08/796,033

[22] Filed: Feb. 5, 1997

[30] Foreign Application Priority Data

Feb. 20, 1996 [JP] Japan ................................ H8-032288

[51] Int. Cl.[7] .................................................. H04L 12/24
[52] U.S. Cl. ......................... 370/251; 370/384; 370/468
[58] Field of Search ..................................... 370/241, 468, 370/537, 384, 250, 251; 340/825.06

[56] References Cited

U.S. PATENT DOCUMENTS

| | | | |
|---|---|---|---|
| 5,418,783 | 5/1995 | Yamaki et al. | 370/528 |
| 5,596,572 | 1/1997 | Wille-Fier et al. | 370/360 |
| 5,600,640 | 2/1997 | Blair et al. | 370/360 |
| 5,768,278 | 6/1998 | Virdee et al. | 370/468 |

*Primary Examiner*—Alpus H. Hsu
*Attorney, Agent, or Firm*—Antonelli, Terry, Stout & Kraus, LLP

[57] ABSTRACT

A maintenance and supervising system and method for a multiplex communication system having mutually connected multiple pieces of multiplex communication equipment. A call controller executes call control by common channel signaling. A multiplexer multiplexes multiple communication data, and a fixed connection allocation device allocates multiplexed data within a multiplex circuit fixedly. A dynamic connection allocation device allocates multiplexed data within the multiplex circuit dynamically, and a piece of connection form switching equipment is provided. A piece of terminal equipment for maintenance and supervising is connected to one of the pieces of multiplex communication equipment. A call connection message is transmitted via common channel signaling, and the piece of maintenance and supervising equipment and the piece of multiplex communication equipment to be maintained and supervised are connected by securing a dynamic connection band in a multiplex circuit at the time of maintenance and supervising. The dynamic connection band is used for normal communication when not in use for maintenance and supervising.

8 Claims, 4 Drawing Sheets

MAINTENANCE AND SUPERVISORY CONTROL METHOD AND SYSTEM FOR MULTIPLEX COMMUNICATION EQUIPMENT

BACKGROUND OF THE INVENTION

This invention pertains to multiplex communication technology and relates to a maintenance and supervisory control method and a maintenance and management system for a multimedia multiplex communication system consisting of multiple multiplex communication equipment where maintenance and supervising of multiple multiplex communication equipment are achieved by one maintenance terminal equipment using common channel signaling.

In a multimedia multiplex communication system, maintenance and supervising must be executed to monitor whether each piece of terminal equipment is functioning properly and to implement restoration work so that the equipment will function properly in case of error. In maintenance and supervising work, a maintenance and supervisory terminal normally collects information from each piece of multiplex communication equipment, sets or refers office data to each piece of multiplex communication equipment, executes various tests and collects results thereof.

Therefore, when maintaining and supervising a multiplex communication system in the past, a method whereby a maintenance terminal for management is installed at each piece of multiplex communication equipment was employed, or when maintenance and supervising were to be made by the maintenance and supervising terminal equipment installed at one location, a method whereby maintenance is executed through data communication by fixed allocation of a band for maintenance communication in the multiplex circuit interconnecting each piece of multiplex communication equipment for maintenance and supervising was employed.

In these conventional maintenance and supervising methods, however, there were problems as described below.

In the case of installing a piece of maintenance terminal equipment at each piece of multiplex communication equipment, there would be many pieces of maintenance terminal equipment, and maintenance personnel had to be dispatched to each installation location of maintenance terminal equipment for maintenance and supervising work, resulting in the problems of high initial cost and high running cost. Furthermore, in order to maintain and manage each piece of multiplex communication equipment, management of the total multiplex communication equipment system would become necessary, which is difficult to accomplish.

On the other hand, in the case of maintenance and supervising through data communication by allocating a maintenance communication band in the multiplex circuit for maintenance and supervising, the maintenance communication band had to be secured within the multiplex circuit between each piece of multiplex communication equipment connected, resulting in a limitation of the data communication band for use by the users, contrary to the basic objective for having a multiplex communication system.

SUMMARY OF THE INVENTION

This invention is made in consideration of the above problems, and it is intended to provide a maintenance and supervisory control method and a maintenance and management system for multiplex communication equipment whereby maintenance is executed using an available data communication band within the multiplex circuit by employing common channel signaling with one piece of maintenance and supervising terminal equipment.

In order to achieve the above objective, this invention comprises a call control measure by common channel signaling and a dynamic allocation measure whereby a dynamic connection band is allocated by common channel signaling, and is structured in a way that a maintenance band is allocated dynamically within the multiplex circuit for maintenance data communication using the common channel signaling only when maintenance and supervising are to be executed.

PREFERRED EMBODIMENTS OF THE INVENTION

Figure 1:
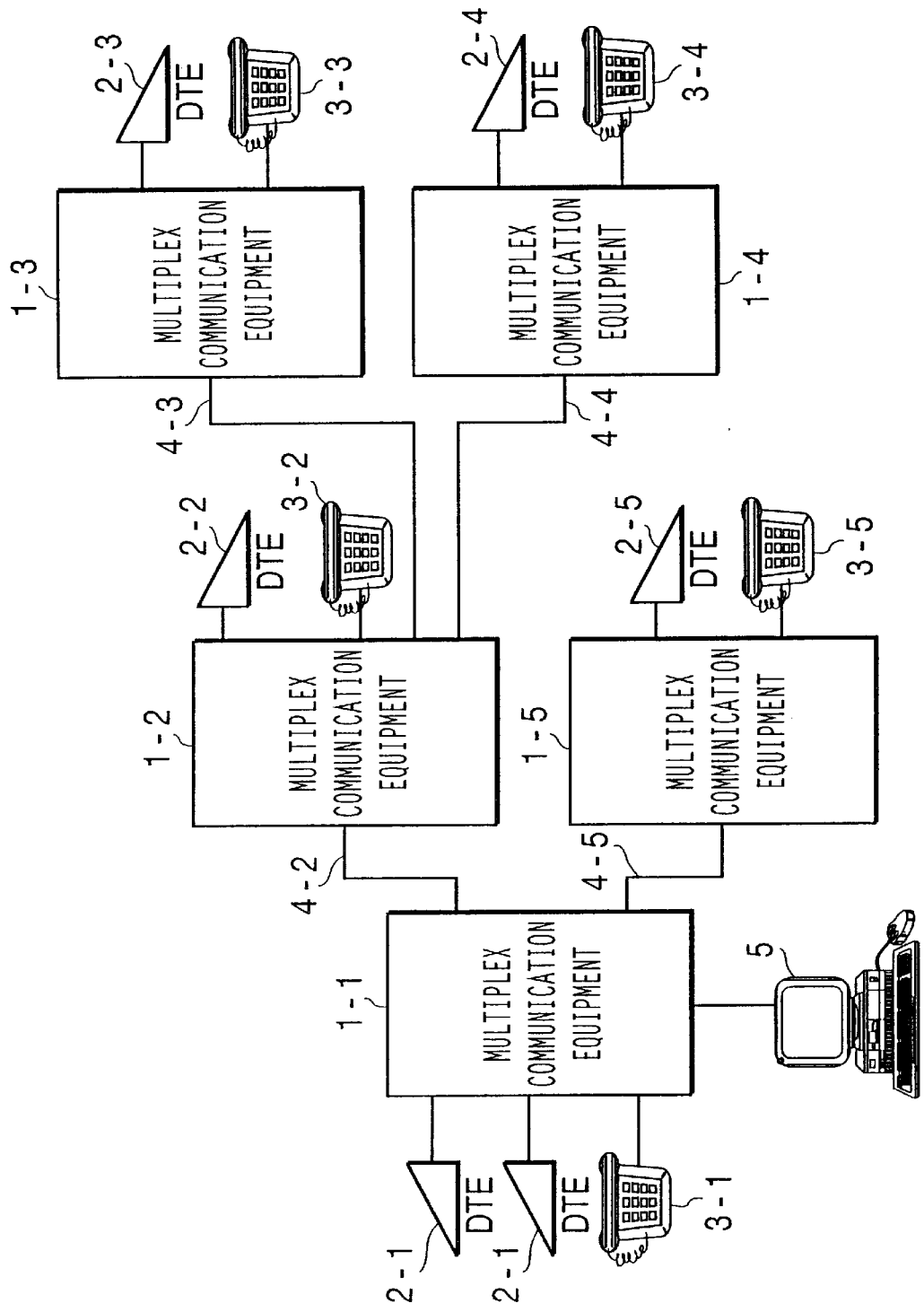
FIG. 1 is a block diagram of the maintenance and management system for multiplex communication equipment under this invention.

A maintenance and management system for multiplex communication equipment and a maintenance and control method for multiplex communication equipment under this invention are explained below by referring to the drawings.

FIG. 1 is a block diagram of the maintenance and management system for multiplex communication equipment under this invention. A multiplex communication system and a maintenance and management system for multiplex communication equipment under this invention comprise multiplex communication equipment 1-1 to 1-5 accommodating respectively data terminal equipment (hereinafter called DTE) 2-1 to 2-5 and voice terminal equipment 3-1 to 3-5, a piece of maintenance terminal equipment 5 accommodated in one of the pieces of multiplex communication equipment, and multiplex circuits 4-2 to 4-5 connecting between the pieces of multiplex communication equipment.

Figure 2:
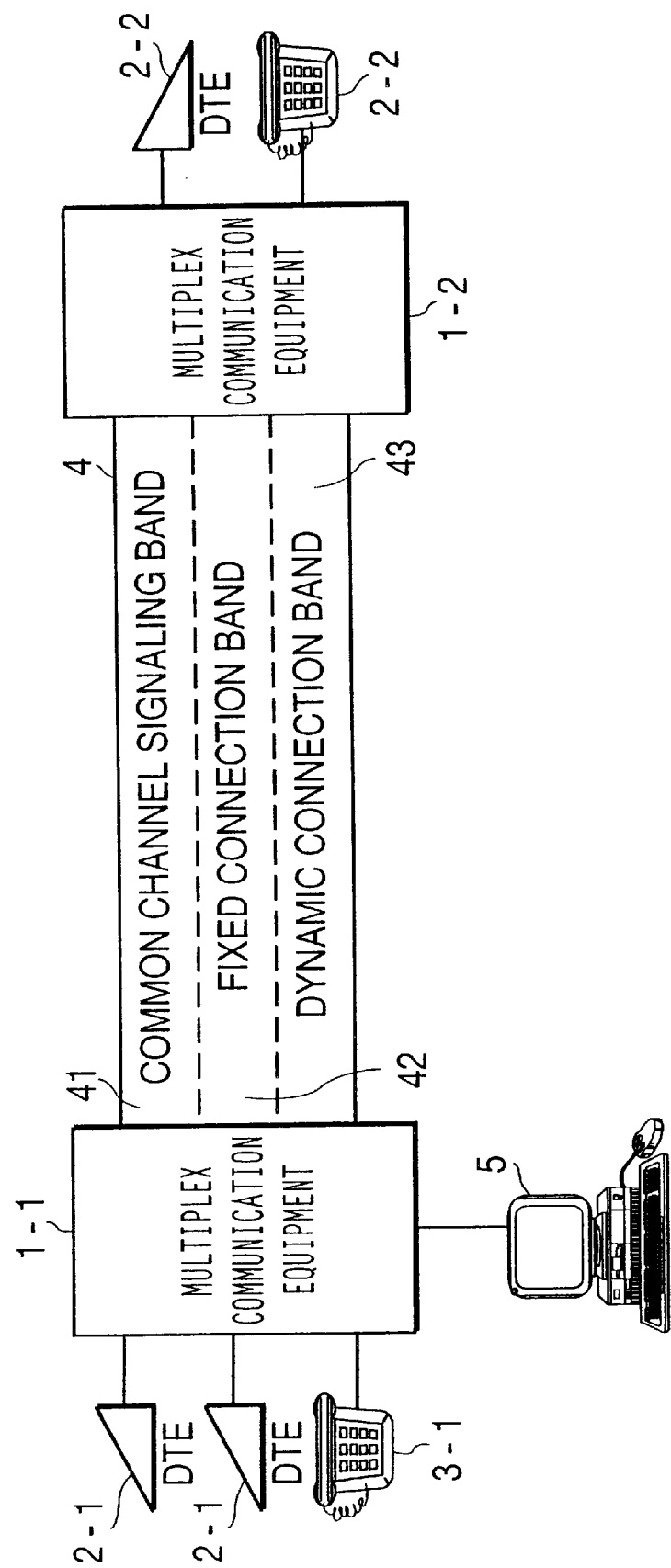
FIG. 2 depicts an example of band usage of a multiplex communication circuit under this invention.

Operation of the maintenance and management system for multiplex communication system and the multiplex communication equipment under this invention is explained by using FIG. 1 and FIG. 2. FIG. 2 shows an example of the usage of the communication circuit bands using the example of communication between multiplex communication equipment 1-1 and multiplex communication equipment 1-2.

The multiplex communication system where this invention is applied is characterized by the fact that the multiplex circuit 4 is used by dividing it into a fixed connection band 42 which provides a fixed connection such as the connection between DTE 2-1 and DTE 2-2, a dynamic connection band 43 which provides dynamic connection (on demand) between voice terminals, such as a telephone or facsimile machine, when connection is requested, and common channel signaling band (Dp channel) 41, and that the call connection of dynamic connection band 43 is made by using common channel signaling band 41.

In other words, as shown in FIG. 2, the multiplex communication system where a maintenance and management system under this invention is applied uses communication circuit 4 by dividing it into a common channel signaling band (Dp channel) 41 for call control which is used by common channel signaling, a fixed connection band 42 which is permanently secured regardless of use or non-use for data communication, and a dynamic connection band 43 which is secured according to the communication amount when required by the user and restored to open condition after the communication is finished.

Similarly, connections between multiplex communication equipment 1-2 to 1-3 and between multiplex communication equipment 1-2 to 1-4 are provided via multiplex circuits 4-3 and 4-4, respectively, and a connection between multiplex communication equipment 1-1 to 1-5 is provided via multiplex circuit 4-5.

Each multiplex circuit 4 accomplishes data or voice information communication by using a fixed connection band 42, which is allocated for fixed connection, and a dynamic connection band 43, which is allocated by common channel signaling only when communication is required. Communication of information related to call connection for dynamic connection is accomplished by using a Dp channel 41.

Maintenance terminal equipment 5, connected to multiplex communication equipment 1-1, secures a band for data transmission in the dynamic connection band by designating the address of a piece of multiplex communication equipment 1-2 to 1-5, transmits its call connection information using Dp channel 41, and thus accomplishes maintenance of the designated multiplex communication equipment.

Figure 3:
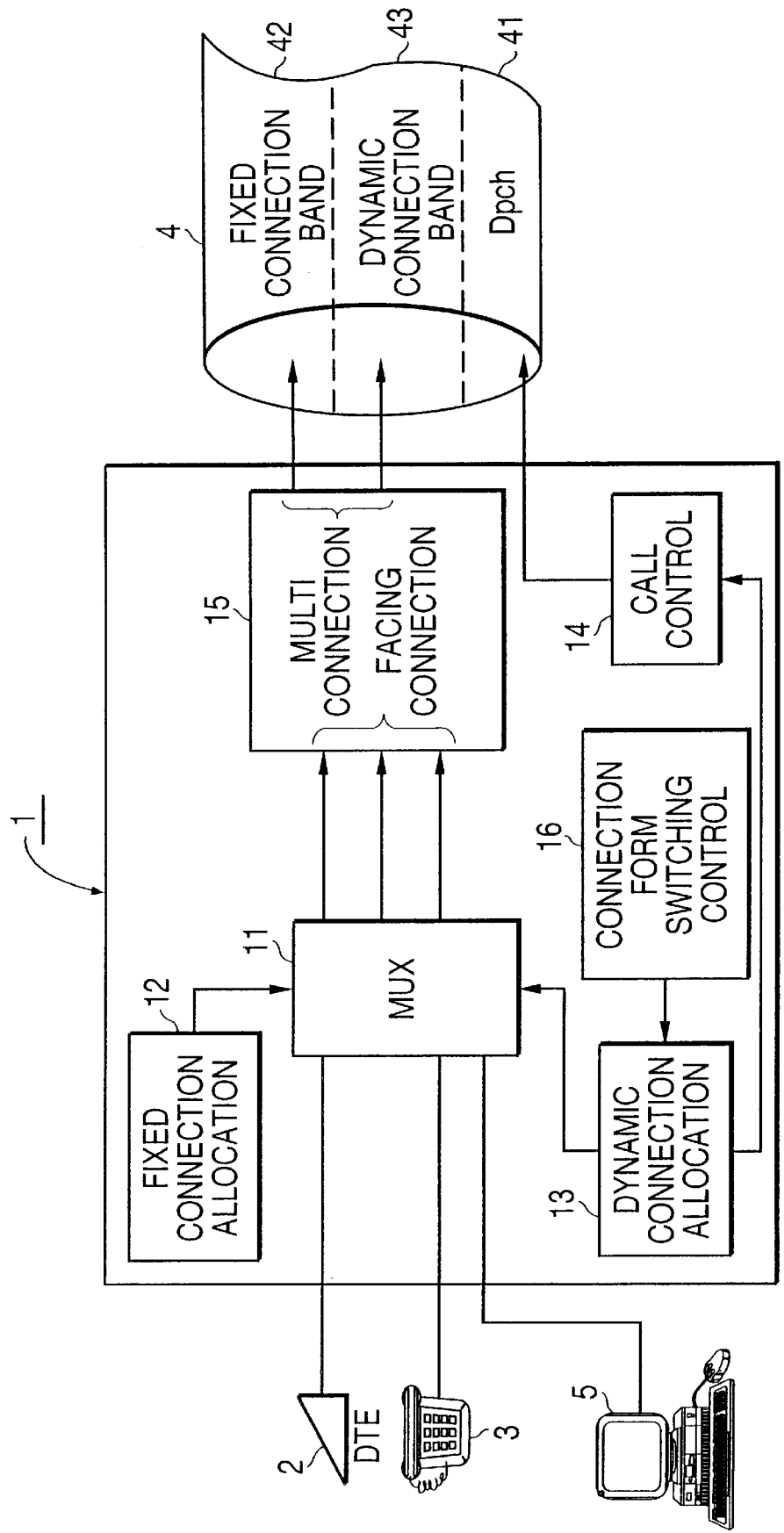
FIG. 3 is a functional block diagram of the detailed construction of the multiplex communication equipment under this invention.

Detailed structure of multiplex communication equipment 1 is explained by using FIG. 3.

Multiplex communication equipment 1 comprises a multiplexing means 11 which multiplexes multiple communication data such as the data from DTE 2 and voice information from voice terminal equipment 3, a fixed connection allocation means 12 which fixedly allocates part of the aforementioned multiplexed data which is to be fixedly connected within the multiplex circuit, a dynamic connection allocation means 13 which dynamically allocates on-demand data, which is part of the aforementioned multiplexed data and connected to the other party equipment according to the connection request, within the multiplex circuit, a call control means (Dp control means) 14 which executes call control by common channel signaling, a means 15 which makes the above connections either in the form of facing connection or multi connection, and a connection form switching control means 16.

The data from DTE 2 is fixedly transmitted to the DTE of the other party via a fixed connection band previously secured within multiplex circuit 4 according to preset information. Fixed allocation within multiplex circuit 4 is done by fixed connection allocation means 12.

In the case of on-demand communication, where connection is made to the voice terminal equipment of the other party based on the connection request from voice terminal equipment 3, such as a telephone or facsimile machine, connection with the terminal equipment of the other party is made via dynamic connection band 43 of multiplex circuit 4 based on the connection request information. Dynamic allocation to multiplex circuit 4 is done by dynamic connection allocation means 13.

Call connection information required for such connection is transmitted to the multiplex communication equipment of the other party via Dp channel 41 of multiplex circuit 4 by the execution of call control in common channel signaling by Dp channel control means 14.

Multiplex communication equipment of the other party will then make a judgement of whether the call connection is for the voice terminal equipment under its accommodation or not based on the call connection information received, and makes call connection to the voice terminal equipment under its accommodation to the voice terminal equipment concerned. If the received call connection information is for voice terminal equipment other than the one under its accommodation, multiplex communication equipment of the other party will execute the same process as the originating multiplex communication equipment to relay the information to the other applicable multiplex communication equipment.

Means 15, which makes facing connection or multi connection, determines the connection form depending on the form of fixed connection or dynamic connection, whether it is in the form of facing connection where connection is made one-to-one to the other terminal equipment or in the form of multi connection where connection is made to multiple terminal equipment, and executes processes such as transmission line setting and call connection message processing.

Connection form switching means 1G switches connection form in a way to make call connection by using common channel signaling and by securing an open channel of dynamic connection band 43 when maintenance terminal equipment 5 is to be connected to the multiplex communication equipment under maintenance and supervisory control and to make dynamic connection band 43 available to terminal equipment connected dynamically, such as voice terminal equipment 3, when maintenance terminal equipment 5 is not connected to the multiplex communication equipment under maintenance and supervisory control.

Operation of the maintenance and management system for multiplex communication equipment is further explained in detail below and maintenance control method for multiplex communication equipment under this invention is explained using FIG. 4 which is an operational flow chart of the maintenance communication process.

First, a method to determine the multiplex circuit route and to secure the maintenance communication band according to the result of analysis of call control information of common channel signaling made by multiplex communication equipment is explained.

The first method is to make connection to the next applicable multiplex communication equipment after confirming that the destination number and the destination sub-address indicated by the call control method do not agree with the address of each piece of terminal equipment 1 to 11 previously registered in its own multiplex communication equipment 12 to 16 or with the address for maintenance of own equipment, similar to the normal case of common channel signaling.

The second method is to add an identifier of the maintenance applicable multiplex communication equipment to each item of information (such as user information and sub-address) in the call control message of common channel signaling by the call control equipment, and to analyze the information by the receiving equipment and to transmit to the multiplex circuit to which the applicable multiplex communication equipment is connected.

The third method is to add a call control message unique to this multiplex communication equipment to common channel signaling, to set information, such as the maintenance applicable multiplex communication equipment, maintenance communication multiplex circuit and bandwidth, to the message, and to make connection to the maintenance applicable multiplex communication equipment.

One of the above methods will allow analysis as to which multiplex communication equipment is the equipment concerned.

Operation of multiplex communication equipment 1-2 which relays information between multiplex communication equipment 1-1 and multiplex communication equipment 1-3, which is subject to maintenance, is explained in detail below using the example of a case where multiplex communication equipment 1-3 is maintained from maintenance terminal equipment 5.

The maintenance address of multiplex communication equipment 1-3 is entered by maintenance terminal equipment 5, and connection to multiplex communication equipment 1-2 is made (S1). Multiplex communication equipment 1-2 which received the address entered by maintenance terminal equipment 5 proceeds to address analysis process (S2).

If it is analyzed that multiplex communication equipment 1-3 is the equipment concerned according to one of the three methods explained earlier, multiplex communication equipment 1-2 will make a call to multiplex communication equipment 1-3 using common channel signaling (S7).

Multiplex communication equipment 1-2 monitors if this connection has been accomplished or not (S8), and if accomplished, part of the dynamic connection band of multiplex circuit 4-2 and 4-3 which is not being used for communication is allocated to maintenance band (S9), and connection between maintenance terminal equipment 5 and multiplex communication equipment 1-3 in call control communication band 41 is completed (S10).

After the connection with multiplex communication equipment 1-3 has been accomplished, maintenance terminal equipment 5 makes maintenance communication and executes maintenance of multiplex communication equipment 1-3 (S11).

Multiplex communication equipment 1-2 recognizes the finish of maintenance by receipt of a disconnect/open-circuit message in common channel signaling from multiplex communication equipment 1-1 and multiplex communication equipment 1-3 or by monitoring the signal line of multiplex circuit 4-2 and 4-3, executes disconnection/releasing of multiplex circuit 4-2 and 4-3 by using common channel signaling of call control communication band, thus restores dynamic connection band of multiplex circuit 4-2 and 4-3 to free condition (S6).

Next, the case of maintaining multiplex communication equipment 1-2 from maintenance terminal equipment 5 is explained. As a result of analyzing the address in step S2, multiplex communication equipment 1-2 judges that the address entered from maintenance terminal equipment 5 is for its own equipment 1-2, secures part of dynamic connection band 43 of multiplex circuit 4-2 which is not being used for maintenance (S3), completes connection for maintenance by using call control communication band 41 (S4), and executes maintenance communication (S5).

After the maintenance is finished, the section of call control communication band 41 secured for maintenance by using common channel signaling is disconnected/released, dynamic connection band 43 is restored to open condition (S6), and a series of operation is finished.

Figure 4:
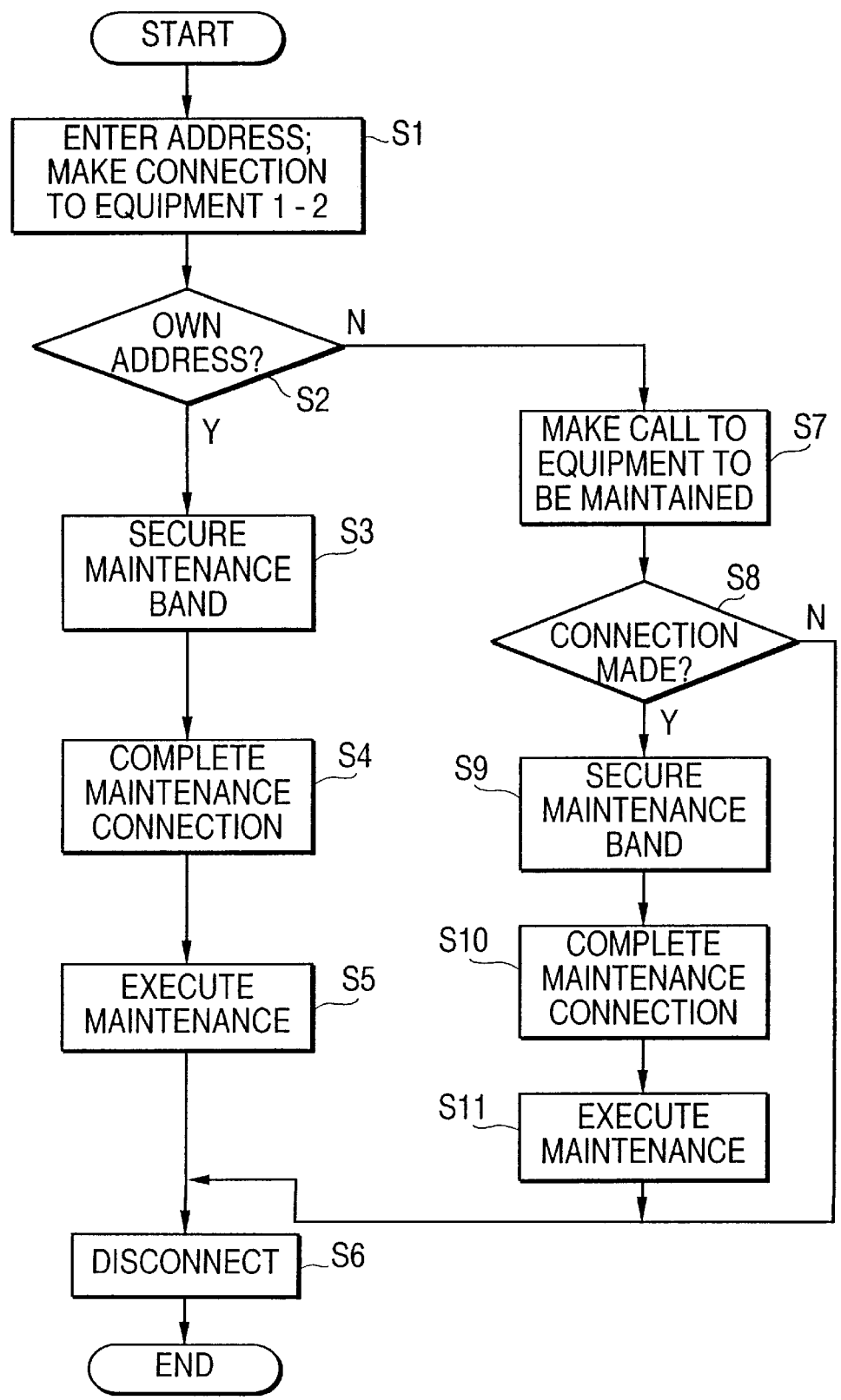
FIG. 4 is an operational flow chart of the maintenance communication method under this invention.

As explained above, each piece of multiplex communication equipment operates as shown in the flow chart of FIG. 4, and maintenance and supervising of all multiplex communication equipment can be accomplished from a piece of maintenance terminal equipment installed in one location, even in the case of a multiplex communication system having multiple pieces of multiplex communication equipment connected, without securing a data transmission line for maintenance and supervising separately and permanently.

Furthermore, in case an error has occurred to any piece of the multiplex communication equipment, the error can be informed from the multiplex communication equipment in error to multiplex communication equipment 1-2 to which maintenance terminal equipment 5 is connected by creating a route in common channel signaling as explained above. In this case, supervising of each piece of multiplex communication equipment can be achieved without securing a band for maintenance separately in the multiplex circuit by setting the error notification information to each piece of information (such as user information and sub-address) in the call control message in common channel signaling as error code, or by using the method of adding an error notification message to common channel signaling and relaying the content to the maintenance terminal equipment.

By structuring the multiplex communication system as described above, maintenance and supervising of a multiplex communication system can be accomplished by one piece of maintenance terminal equipment by minimizing the band used for maintenance by multiplex communication equipment and with almost no effect on the normal communication.

As explained above, according to this invention, there is no need to secure a communication band for maintenance separately and permanently in a multiplex communication system, and multiple pieces of multiplex communication equipment can be maintained and supervised by one piece of maintenance terminal equipment installed in one location.

We claim:

1. A maintenance, supervising and control method for a multiplex communication system made up of a plurality of pieces of multiplex communication equipment interconnected by a multiplex circuit, said method comprising the steps of:
    (a) transmitting on a common channel signaling band in the multiplex circuit a call connection message for a dynamic connection band in the multiplex circuit;
    (b) in response to step (a) selecting a dynamic connection band not in use; and
    (c) connecting a piece of maintenance and supervising terminal equipment to one of the pieces of multiplex communication equipment according to common channel signaling, utilizing the selected dynamic connection band.

2. A method as claimed in claim 1, further comprising performing maintenance to said one of the pieces of multiplex communication equipment.

3. A method as claimed in claim 1, further comprising using the selected dynamic connection band for normal communication when not in use for maintenance and supervising.

4. A maintenance, supervising and control method for a multiplex communication system made up of a plurality of pieces of multiplex communication equipment interconnected by a multiplex circuit including a plurality of dynamic connection bands and a common channel signaling band, said method comprising the steps of:
    (a) transmitting on the common channel signaling band a call connection message from one of the pieces of multiplex communication equipment for a dynamic connection band in the multiplex circuit;

(b) in response to step (a), selecting a dynamic connection band not in use for communication;

(c) securing the selected dynamic connection band; and (d) connecting a piece of maintenance and supervising terminal equipment to said one of the pieces of multiplex communication equipment, utilizing the secured dynamic connection band.

5. A multiplex communication equipment maintenance and management system, comprising:

a plurality of pieces of multiplex communication equipment, including data terminal equipment, voice terminal equipment, and a multiplexer for multiplexing data signals from the data terminal equipment and voice signals from the voice terminal equipment;

a plurality of multiplex circuits interconnecting said plurality of pieces of multiplex communication equipment, each multiplex circuit including a fixed connection band for fixedly interconnecting two of the pieces of multiplex communication equipment for data communication therebetween, a dynamic connection band for dynamically interconnecting two of the pieces of multiplex communication equipment for voice communication therebetween, and a common channel signaling band for communicating connections for the dynamic connection band;

a piece of maintenance terminal equipment connected to one of the pieces of multiplex communication equipment;

call control means responsive to presence of a maintenance request from a piece of multiplex communication equipment other than said one of the pieces of multiplex communication equipment for utilizing said common channel signaling band to arrange interconnection of said piece of maintenance terminal equipment to the requesting piece of multiplex communication equipment by securing a dynamic connection band, and responsive to absence of maintenance requests for making the secured dynamic connection band available for communication of voice signals.

6. A maintenance, supervising and control method for a multiplex communication system made up of a plurality of pieces of multiplex communication equipment interconnected by a multiplex circuit, said method comprising the steps of:

(a) transmitting on a common channel signaling band in the multiplex circuit a call connection message for a dynamic connection band in the multiplex circuit;

(b) selecting a dynamic connection band not in use;

(c) securing the selected dynamic connection band; and (d) connecting a piece of maintenance and supervising terminal equipment to one of the pieces of multiplex communication equipment according to common channel signaling, utilizing the secured dynamic connection band.

7. A method as claimed in claim 6, further comprising performing maintenance to said one of the pieces of multiplex communication equipment.

8. A method as claimed in claim 6, further comprising using the secured dynamic connection band for normal communication when not in use for maintenance and supervising.

* * * * *